United States Patent [19]

Agazzi et al.

[11] Patent Number: 4,866,739

[45] Date of Patent: Sep. 12, 1989

[54] DIGITAL FAST RECOVERY TIMING ALGORITHM

[75] Inventors: Oscar Agazzi, Scotch Plains, N.J.; Chris Cole, Los Altos; Steve Levy, Nevada City, both of Calif.

[73] Assignee: Silicon Systems, Inc., Tustin, Calif.

[21] Appl. No.: 158,346

[22] Filed: Feb. 22, 1988

[51] Int. Cl.$^4$ .................................................. H04L 7/00

[52] U.S. Cl. ...................................... 375/106; 375/102; 307/510

[58] Field of Search .................. 375/99, 100, 101, 102, 375/103, 106; 455/295, 296; 328/162, 165; 307/510, 520

[56] References Cited

U.S. PATENT DOCUMENTS 4,138,644 2/1979 Giodard et al. ...................... 375/101
4,349,916 9/1982 Roeder ................................ 375/103
4,376,309 3/1983 Ferderson et al. .................. 328/162
4,458,355 7/1984 Motley et al. ......................... 375/99
4,675,880 6/1987 Davarian ............................. 375/101

*Primary Examiner*—Benedict V. Safourek
*Assistant Examiner*—Stephen Chin
*Attorney, Agent, or Firm*—Hecker & Harriman

[57] ABSTRACT

The present invention employs a four sample per baud timing recovery scheme to achieve fast acquistion of initial timing phase uncertainity and reliable fast tracking with low jitter for non-equalized QAM wave forms. The present invention operates for data timing frequency uncertainties up to 0.02 percent in the preferred embodiment. The timing recovery system is implemented with programmable digital signal processor code in connection with a programmable phase baud timer. The baud timer may be implemented in software or hardware. The present scheme is based on a pair of quadrature (T/4 spaced) timing error signals derived by a wave difference method. In the wave difference method, the envelope power of each baud sample is computed by square summing the real and imaginary samples of the received analog signal.

22 Claims, 3 Drawing Sheets

TIMING ERROR SAMPLE POINTS

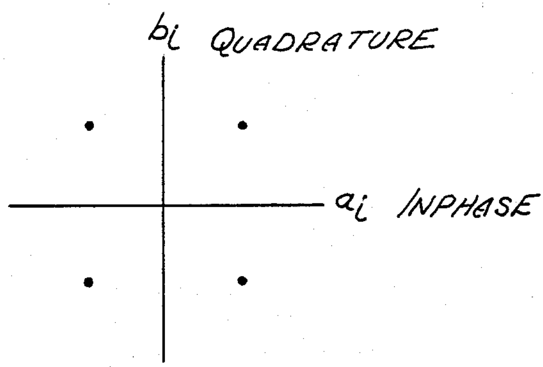
Fig. 4
Fig. 5
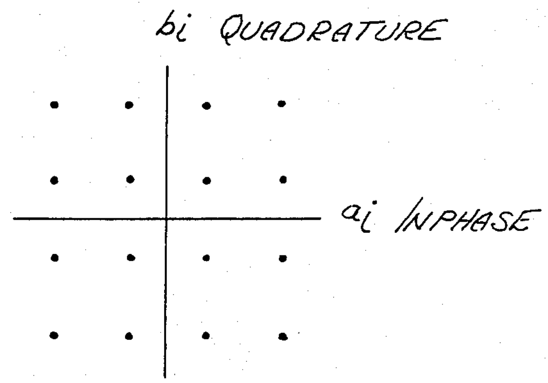

DIGITAL FAST RECOVERY TIMING ALGORITHM

BACKGROUND OF THE INVENTION

1. FIELD OF THE INVENTION

This invention relates to the field of communication transmissions and in particular to the acquisition and tracking of timing phase information.

2. BACKGROUND ART

Communication of data information over the voice network between a sending and receiving station is typically accomplished with a modem (modulator/-demodulator). A modem transforms digital information by modulating it according to one of several well known modulating schemes. This modulated data is transmitted to the receiving modem, where it is demodulated to produce the original information. To properly demodulate and decode transmitted information, the clock rate of the transmission must be known to the demodulator. Typically, timing information is taken from the transmitted signal itself by means of various techniques.

One prior art transmission method utilizes a "header" of set up and timing information transmitted in quadrature phase shift key (QPSK) mode followed by actual data transmitted in quadrature amplitude modulation (QAM) mode. In the prior art, timing signal acquisition is accomplished by determining maximum or minimum baud energy in a baud uncertainty region and correcting initial timer phase accordingly. A baud timer is advanced or retarded in phase by fixed increments in response to an error signal. Although such a scheme is inadequate for acquiring timing signals from the QPSK header portion of a signal, it is inadequate if a disturbance requires re-acquisition of the timing signal after the modem is in the QAM transmission mode.

SUMMARY OF THE PRESENT INVENTION

The present invention employs a four sample per baud timing recovery scheme to achieve fast acquisition of initial timing phase uncertainty and reliable fast tracking with low jitter for non-equalized QAM wave forms. The present invention operates for data timing frequency uncertainties up to 0.02 percent in the preferred embodiment. The timing recovery system is implemented with programmable digital signal processor code in connection with a programmable phase baud timer. The baud timer may be implemented in software or hardware. The present scheme is based on a pair of quadrature (T/4 spaced) timing error signals derived by a wave difference method. In the wave difference method, the envelope power of each baud sample is computed by square summing the real and imaginary samples of the received analog signal.

In the preferred embodiment of the present invention, four samples per baud are taken from a timing wave. Nominally, two samples (e.g. Y1, Y3) are taken at the points of maximum slope on a substantially sinusoidal wave form. Two other samples (e.g. Y2 and Y0) are taken at the points of maximum and minimum amplitude respectively. The circuitry of the present invention seeks to maximize the magnitude of the difference between samples Y2 and Y0 and to minimize the magnitude of the difference between samples Y1 and Y3. This is accomplished by advancing or retarding the timing phase as necessary. The sign of the difference terms is utilized to indicate the nature of correction required for maximum efficiency in timing signal recovery.

Therefore, it is an object of the present invention to provide a timing recovery technique which permits rapid re-acquisition of timing signals in the QAM transmission mode.

It is another object of the present invention to provide a timing recovery technique responsive to gain transient disturbances in a signal path.

It is yet another object of the present invention to provide a timing recovery technique providing reliable tracking with low jitter for non-equalized QAM wave forms.

Other objects and attendant advantages will become apparent upon a reading of the specification in which like reference numerals refer to like parts throughout and in which:

BRIEF DESCRIPTION OF THE DRAWINGS

FIG. 4 illustrates a 4 point QPSK constellation.

FIG. 5 illustrates a 16 point QAM constellation.

DETAILED DESCRIPTION OF THE PRESENT INVENTION

Figure 1:
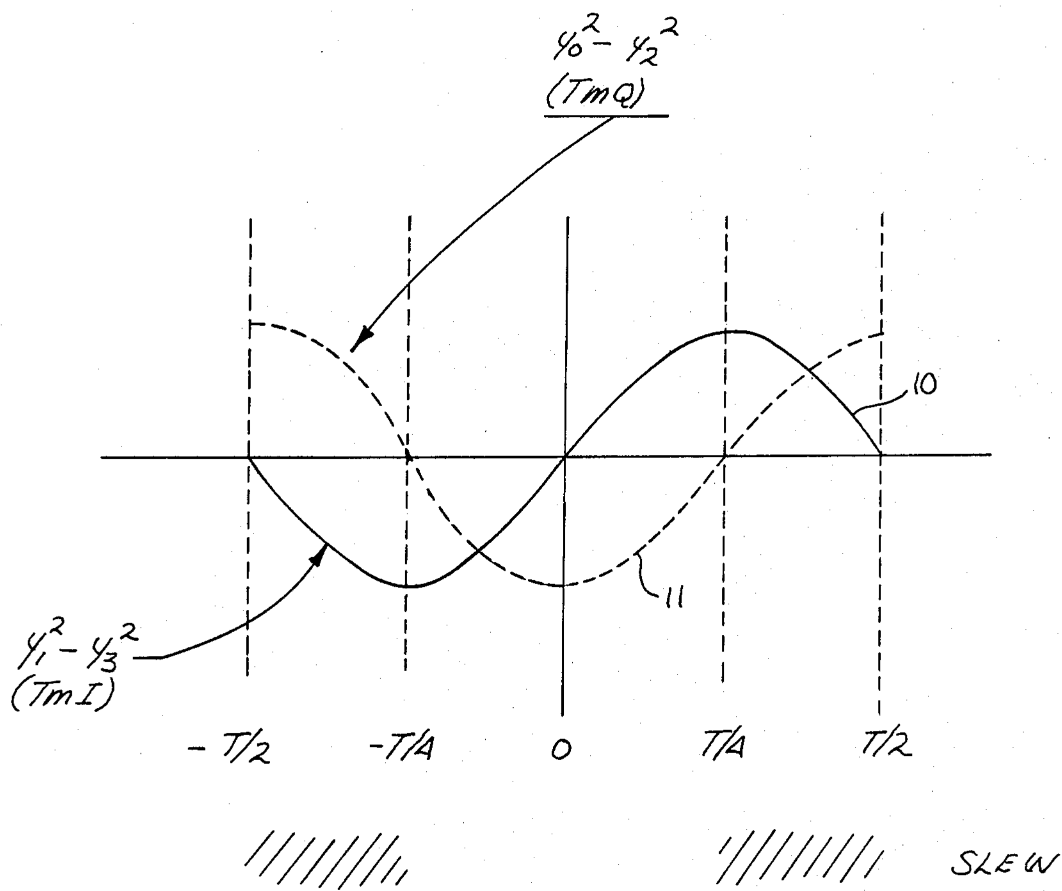
FIG. 1 illustrates a graph showing error functions of the present invention.

A timing recovery technique for use in data communication is described. In the following description, numerous specific details, such as baud rate, uncertainty range, etc., are set forth in order to provide a more thorough understanding of the present invention. It will be obvious, however, to one skilled in the art, that the present invention may be practiced without these specific details. In other instances, well known features have not been described in detail in order not to unnecessarily obscure the present invention.

QPSK signals are generated by shifting the phase of a carrier wave by $\pi/2$ radians. A QPSK signal has one of four possible phases, each phase representing one of four binary pairs (00, 01, 10, 11). The QPSK wave is defined by:

$$S_i(t) = \cos(\omega_{ct} + \theta_i)$$

where $i = 1,2,3,4$ $$-T/2 \leqq t \leqq T/2$$

$$\theta_i = 0, +/-\pi/2, \pi$$

or $\theta_i = +/-\pi/4, +/-3\pi/4$

Transmission of this type is often called quadrature transmission, with two carriers in phase quadrature to one another (cosine $\omega_{ct}$ and sine $\omega_{ct}$) transmitted simultaneously over the same channel.

The QPSK signals can be represented in a two dimensional diagram as shown in FIG. 4. The horizontal axis corresponds to the location of $a_i$ and is called the in-phase axis. The vertical axis corresponding to $b_i$ is called the quadrature axis. The signal points in the four quadrants of FIG. 4 represent a signal constellation.

By assigning multiple values to $a_i$ and $b_i$, the multi-level symbol signalling scheme known as quadrature amplitude modulation (QAM) is generated. The QAM scheme involves multi-level amplitude modulation applied independently to each of the quadrature carriers. In this manner, a 16 state constellation such as that shown in FIG. 5 may be generated. Each point of the QPSK modulation scheme of FIG. 4 now represents four points in the QAM scheme so that a total of 16 points are defined in the QAM constellation. The general QAM signal is given by:

$$S_i(t)=r_i\cos(\omega_{ct}+\theta_i)$$

where the amplitude $r_i$ is given by the appropriate combinations of ($a_i$, $b_i$). A phase detector/amplitude level detector combination is then used to extract digital information.

As previously discussed, it is necessary to extract timing information so that the demodulation of the signal may be achieved. Both QPSK and QAM signals lack envelope information so that synchronous detection is required. In other words, both the frequency and the phase of the incoming signal must be matched by the demodulator to accurately decode the information signal.

The present invention uses a four sample per baud timing recovery algorithm to achieve fast acquisition of initial timing phase uncertainty and provide reliable tracking with low jitter for non-equalized QAM wave forms with data timing frequency uncertainties up to 0.02 percent. The timing recovery scheme may be implemented in programmable digital logic in connection with a programmable phase baud timer. If desired, the baud timer could be implemented as a programming loop. The scheme of the present invention is based on a pair of quadrature (T/4 spaced) timing error signals derived by the wave difference method. In the wave difference method, the envelope power of each baud sample is computed by square summing the real and imaginary samples of the received signal. Thus, four power samples per baud are obtained. The timing error signals are obtained by differencing T/2 spaced power samples. In the preferred embodiment of the present invention, these timing error signals are averaged using a box car integrator algorithm which decimates the sampling rate for feedback loop updates.

Figure 2:
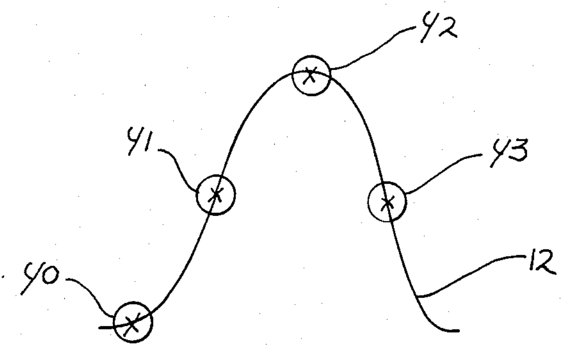
FIG. 2 illustrates a graph showing timing error sample points utilized in the preferred embodiment of the present invention.

Referring to FIG. 2, a baud sample illustrating the sample points of the preferred embodiment of the present invention is illustrated. Sample points of the baud sample 12 are taken at the minimum and maximum amplitude (Y0 and Y2) as well as at the locations of maximum slope (Y1 and Y3). The goal of the timing recovery scheme of the present invention is to minimize the difference between Y1 and Y3 and to maximize the difference between Y2 and Y0. Referring now to FIG. 1, the timing error signals 10 and 11 are illustrated. Error signal 11 is generated by taking the differnce of the square of the amplitude of sample points Y0 and Y2. The samples are spaced at T/2. Error signal 10 is generated by the difference of the square of the amplitude of samples Y1 and Y3 also spaced at T/2 apart. Timing error signals 10 and 11 are averaged using a box car integrator algorithm which decimates the sampling rate for feedback loop updates.

In operation, both the sign and magnitude of the error signals 10 and 11 are utilized to direct the timing recovery loop. In the preferred embodiment, Y0 is nominally at the lowest amplitude of the baud sample and Y2 is at the greatest amplitude. Therefore, error signal 11, generated by the equation $Y0^2-Y2^2$, is driven to a negative number. Referring briefly to FIG. 1, the plot of error function value verses timing error is illustrated. Error signal 11 is at its maximum negative value when the timing error is 0. As long as the error signal 11 is negative, the timing recovery is within plus or minus T/4 baud and normal tracking of the signal is adequate. If the error signal 11 goes positive, the timing signal is off by approximately a half cycle and a quick tracking recovery loop is required. Correspondingly, the magnitude of the error signal can be used to indicate the degree of offset in the sampling points.

Still referring to FIG. 1, error signal 10, generated by the equation $Y1^2-Y3^2$ is nominally 0 when there is no error in the timing recovery. The sign of error signal 10 indicates whether the sampling points are ahead or behind of the optimal position.

In the preferred embodiment of the present invention, timing recovery is accomplished in a three step process, consisting of coarse acquisition, coarse tracking and fine tracking. In the coarse acquisition mode, the quadrature timing error signals 10 and 11 are used to generate a stepping decision which reduces the timing phase ambiguity to plus or minus T/8 baud period. Timing error signal samples are integrated for a significant interval to insure high reliability of the stepping decision in the presence of severe wave form distortion due to poor channel equalization.

After a multi-step coarse acquisition, coarse tracking is implemented and the timing error signal 10 is used to control a proportional feedback loop with relatively high loop gain. In this mode, the timing phase and frequency error are reduced to approximately plus or minus T/32 per baud period. The quadrature timing error signal sign is used to count the numnber of consecutive baud periods for which the timing error is less than T/8 in order to confirm phase lock. After a sufficient consecutive number of samples within the timing error window (in the preferred embodiment 10) is reached, fine tracking is implemented.

The fine tracking mode employs maximum box car integration (and correspondingly minimum loop update rate) consistent with tracking a maximum frequency offset of approximately 0.02 percent with a first order loop. Thus, the fine tracking loop filter limits the peak timing adjustment noise present in the loop from data dependant error signal variations to achieve a low level of timing jitter with a worst case QAM wave form. The integrated quadrature timing error signal serves as a reliable lock-in indicator.

Figure 3:
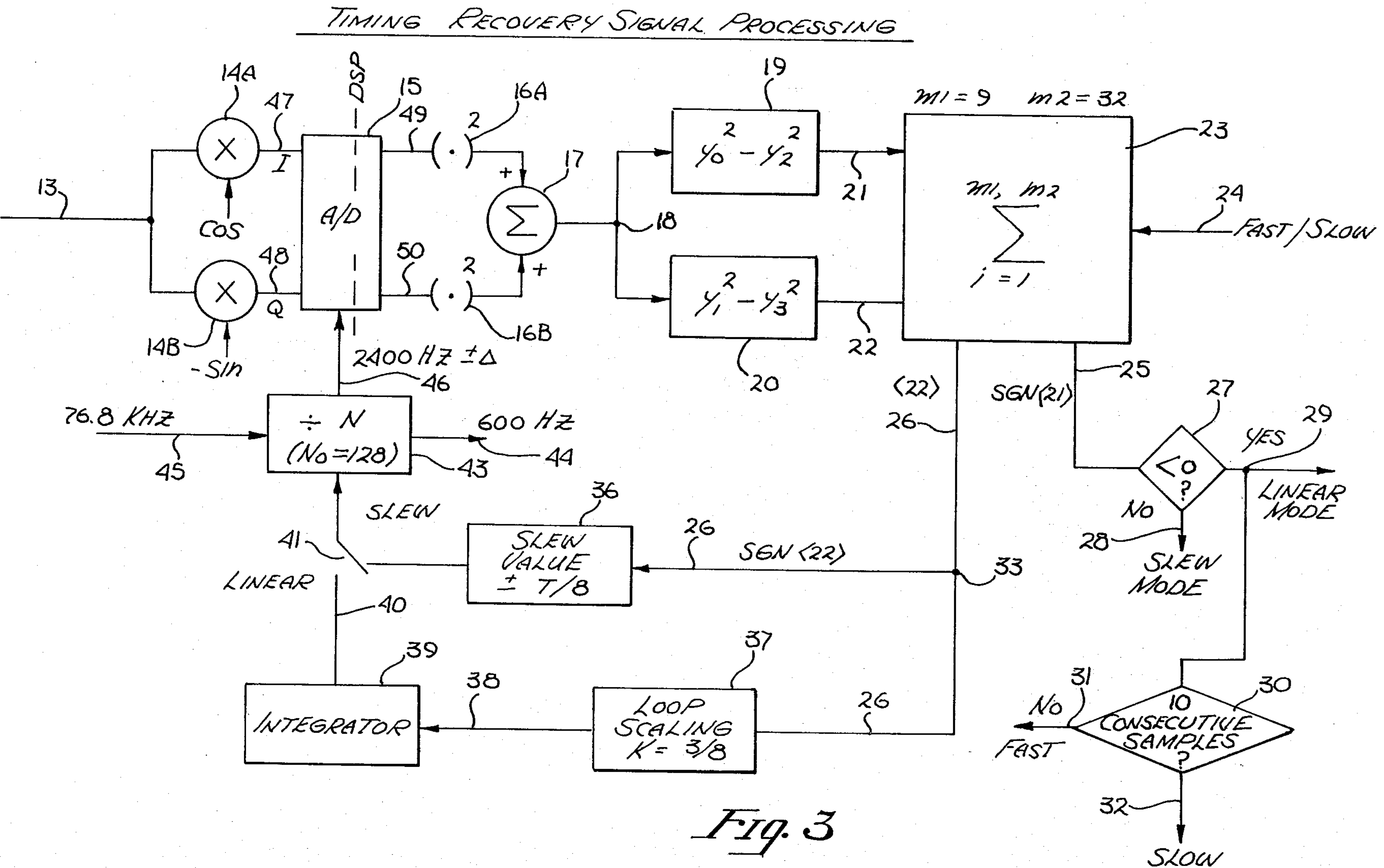
FIG. 3 is a block diagram illustrating timing recovery signal processing of the present invention.

Referring now to FIG. 3, a block diagram illustrating the preferred embodiment of the present invention is illustrated. The QAM signal 13 is multiplied by a cosine term at multiplier 14A and a negative sine term at multiplier 14B to generate inphase and quadrature signals 47 and 48 respectively. Signals 47 and 48 are inputted to A/D 15 and converted to digital outputs 49 and 50 respectively. These outputs are squared at T/2 intervals at multipliers 16A and 16B respectively. The squared signals are summed at summing node 17. The output of summing node 17 at node 18 is coupled to processing blocks 19 and 20. Processing block 19 generates the power difference 21 of the square of the inphase sample points Y0 and Y2. Processing block 20 generates the power difference 22 of the square of the quadrature sample points Y1 and Y3.

The power difference signals 21 and 22 are summed at summer 23. The number of samples summed depends on whether the system is in coarse detect or coarse tracking mode. Enabling signal 24 selects the upper sample limit as 9 in coarse acquisition mode and as 32 in tracking mode.

The quadrature sign signal 25 is outputted from summer 23 to comparator 27 where it is compared to zero. If the sign is negative (less than zero) comparator 27 outputs slew mode signal 28. If the sign is positive (greater than zero) comparator 27 outputs linear mode signal 29. The linear mode signal is inputted to comparator 30. If the linear mode signal 29 is present for 10 consecutive samples, comparator 30 outputs slow signal 32 to summer 23. Until the linear mode signal 29 is present for 10 consecutive samples, comparator 30 outputs fast signal 31 to summer 23. If the linear mode signal 29 is present for 10 consecutive samples, it is assumed that coarse acquisition has taken place and coarse tracking may begin.

The inphase output 26 of the summer 23 is inputted to slew value block 36. The slew value block 36 examines the sign of the signal 26 to determine if the signal should be slewed forward or backward.

The magnitude of the inphase output 26 of summer 23 is multiplied by a constant loop scaling 37. In the preferred embodiment of the present invention this constant is equal to $\frac{3}{8}$. The output 38 of loop scaling 37 is inputed to integrator 39 where it is integrated at the maximum box car integration interval. The output 40 of integrator 39 is coupled to switch 41 along with the output of slew value 36. Slew mode signal 28 and linear mode 29 control switch 41. If the slew mode 28 is present, switch 41 is coupled to the output of slew value 36 for coarse acquisition. If linear mode signal 29 is present, switch 41 is coupled to integrator 39 for either coarse tracking or fine tracking.

Switch 41 is coupled to divide by N 43. Divide by N 43 is coupled to clock 45 which in the preferred embodiment is 76.8 KHz. Divide N outputs a 600 Hz clock 44 and a 2400 Hz clock 46. Clock 46 is coupled to A/D 15.

In operation, the input signal 13 is converted to a complex digital signal having inphase 49 and quadrature 50 portions. These portions are each squared to generate the power envelope of the input wave form and summed at summer 17. A/D 15 is clocked to provide four samples per baud, nominally at the locations Y0–Y3 illustrated in FIG. 2.

Differencing blocks 19 and 20 output power difference signals 21 and 22, corresponding to error signals 11 and 10 respectively. The power difference signals are integrated at summing block 23. The timing recovery of the present invention has both an acquisition mode and a tracking mode. A control signal 24 controls the number of samples summed by the summer 23. In the fast (acquisition) mode, only 9 samples are summed so that decisions may be made more quickly. In the slew (tracking) mode, 32 samples are summd so that the stochastic average approaches the ensemble average. In a linear mode, a large number of samples is required so that the time average remains near the ensemble average. The greater the number of samples, the closer the stochastic average is to the ensemble average and therefore the recovery will remain in linear mode.

The sign of the power difference signals is used to identify the quadrant of the error functions of the present invention. The following table illustrates the quadrant location based on the sign of the power difference signals.

| Signal 21 | Signal 22 | Quadrant |
|---|---|---|
| Positive | Negative | $-T/2 \leqq X \leqq -T/4$ |
| Negative | Negative | $-T/4 \leqq X \leqq 0$ |
| Negative | Positive | $0 \leqq X \leqq T/4$ |
| Positive | Positive | $T/4 \leqq X \leqq T/2$ |

The sign of power difference signal 21 is used to control the slew mode/linear mode decision. If the sign of power difference signal 21 is positive, it is assumed that the timing recovery is approximately half a baud cycle off and slew mode is chosen for fast recovery. If the sign of power difference signal 21 is negative, it is assumed that timing recovery is within a half baud of 0 error and linear mode is selected. The outputs of decision block 27 control switch 41 to select between slew and linear loop outputs.

The sign of the power difference signal 22 is utilized to determine first, if you are in slew mode, whether to slew the timing recovery forward or backward. The magnitude of the power difference signal 22 is utilized in linear mode to determine the amount to move the sampling and a value proportional to the power difference signal 22 is utilized to determine how far to move the sampling.

In the present invention, after first entering linear mode, the sample rate remains low so it can be determined if the system is properly in linear mode. If, after initially entering linear mode, a larger error existed in the timing recovery, it would take 32 baud periods before realizing the error and switching back to slew mode. By artificially keeping the samples low for the first 10 baud periods, quick recovery to slew mode may be implemented.

There are two paths from the summer 23 to control the timing recovery. The first path leads through slew value 36 and the second path leads through loop scaling 37 and integrator 39. The terminal of each loop is coupled to switch 41 and switch 41 is controlled by decision block 27 to select slew or linear path. In the slew mode, the maximum slew is $\pm/-\frac{1}{8}$ of a baud period. The slew mode is used for gross timing recovery and is very quick.

In the linear mode, the magnitude of the power difference 22 is multiplied by scaling factor (in the preferred embodiment $\frac{3}{8}$). The output 38 of loop scaling 37 is integrated at integrator 39 whose output 40 drives the timing loop when switch 41 selects the linear mode.

A clock signal 45 is inputted to a divide by N 43. The clock signal in the preferred embodiment of the present invention is 76.8 KHz, but any suitable clock signal may be utilized. The nominal value of N is 128 in the present invention. This value is moved up or down depending on the output of the slew or linear loops. Thus, the output 46 of the divider 43 is nominally 2400 Hz Hz plus or minus a correction amount. This signal 46 is inputted to the A/D converter 15 to control the sampling points of the input signal.

To reduce timing jitter, the present invention includes an optional limiting block 51 disposed between switch 41 and divider 43. The limiting block 51 limits the amount of change in the value of N to plus or minus 1 in each baud period. The limiting block includes a down counter which is triggered each baud period. For example, if the output of the linear or slew loops would otherwise change N by a value of 8, the limiting block 51 would spread this change out over 8 baud periods. The limiting block includes a down counter pre-set to the correction value.

Thus, a digital timing recovery technique and apparatus for implementing same has been described.

I claim:

1. A circuit for controlling timing recovery of an input signal comprising:

input means for receiving said input signal and generating a plurality of samples of said input signal, said input means for providing a first output signal;

first converting means coupled to said first output signal for converting said first output signal to first and second power difference signals each representing a difference between selected of said plurality of samples;

summing means coupled to said first and second power difference signals for summing a selected number of said first and second power difference signals, said summing means for providing second and third output signals each having a sign and magnitude;

a first scaling means coupled to said second output signal for multiplying said second output signal by a predetermined scaling factor, said first scaling means for providing a fourth output signal;

a second scaling means coupled to said second output signal for providing a fifth output signal having a predetermined value and having a sign equal to said sign of said second output signal;

switch means coupled to said input means and selectably coupled to one of said fourth and fifth output signals dependent on said sign of said third output signal.

first converting means coupled to said first output signal for converting said first output signal to first and second power difference signals each representing a difference between selected of said plurality of samples;

summing means coupled to said first and second power difference signals for summing a selected number of said first and second power difference signals, said summing means for providing second and third output signals each having a sign and magnitude;

a first scaling means coupled to said second output signal for multiplying said second output signal by a predetermined scaling factor, said first scaling means for providing a fourth output signal;

a second scaling means coupled to said second output signal for providing a fifth output signal having a predetermined value and having a sign equal to said sign of said second output signal;

switch means coupled to said input means and selectably coupled to one of said fourth and fifth output signals dependent on said sign of said third output signal.

2. The circuit of claim 1 wherein said input means includes analog to digital converting means.

3. The circuit of claim 1 wherein said plurality of samples comprises four samples per baud period.

4. The circuit of claim 1 wherein said input means further includes means for squaring said samples.

5. The circuit of claim 1 wherein said fifth output signal has a predetermined value of $\frac{1}{8}$ baud period.

6. The circuit of claim 1 further including dividing means disposed between said switch and said input means, said dividing means coupled to a first clock signal, said dividing means dividing said first clock signal by a number dependent on said fourth and fifth output signals.

7. A circuit for controlling timing recovery of an input signal comprising:

input means coupled to said input signal for generating first and second error signals by a wave differencing method;

summing means coupled to said first and second error signals for summing a selected number of said first and second error signals, said summing means for providing third and fourth error signals each having a sign and a magnitude;

first comparing means coupled to said fourth error signal for determining said sign of said fourth error signal;

a second comparing means coupled to said first comparing means, said second comparing means for providing first and second control signals coupled to said summing means for determining said selected number when said sign of said fourth error signal is negative;

first scaling means coupled to said third error signal for multiplying said third error signal by a predetermined scaling factor, said first scaling means for providing a fifth error signal;

second scaling means coupled to said third error signal for providing a sixth error signal having a predetermined value and having a sign equal to said sign of said third error signal;

switch means coupled to dividing means and selectably coupled to one of said fifth and sixth error signals dependent on said output of said first comparing means;

a clock signal coupled to said dividing means, said dividing means dividing said clock signal by a number dependent on said fifth and sixth error signals, said dividing means for providing a seventh error signal coupled to said input means.

8. The circuit of claim 7 wherein said input means comprises means for converting said input signal to a complex signal having a real and an imaginary portion and means for square summing said real and imaginary portions of said input signal.

9. The circuit of claim 7 wherein said selected number of said first and second power difference signals is greater when said sign of said fourth error signal is negative.

10. The circuit of claim 7 wherein said fifth error signal has a magnitude of $\frac{1}{8}$ baud period.

11. The circuit of claim 7 wherein said second comparing means outputs said second control signal when said sign of said fourth error signal is negative for ten consecutive baud periods.

12. A circuit for controlling timing recovery of an input signal comprising:

input means for receiving said input signal and generating a plurality of samples of said input signal, said input means for providing a first output signal;

first converting means coupled to said first output signal for converting said first output signal to first and second power difference signals each representing a difference between selected of said plurality of samples;

summing means coupled to said first and second power difference signals for summing a selected number of said first and second power difference signals, said summing means for providing second and third output signals each having a sign and magnitude;

switch means coupled to said input means and selectably coupled to one of said second and third output signals dependent on said sign of said third output signal.

13. The circuit of claim 12 wherein said input means includes analog to digital converting means.

14. The circuit of claim 12 wherein said plurality of samples comprises four samples per baud period.

15. The circuit of claim 12 wherein said input means further includes means for squaring said samples.

16. A circuit for controlling timing recovery of an input signal comprising:

input means coupled to said input signal for generating first and second error signals by a wave differencing method;

summing means coupled to said first and second error signals for summing a selected number of said first and second error signals, said summing means for providing third and fourth error signals each having a sign and a magnitude;

first comparing means coupled to said fourth error signal for determining said sign of said fourth error signal;

a second comparing means coupled to said first comparing means, said second comparing means for providing first and second control signals coupled to said summing means for determing said selected number when said sign of said fourth error signal is negative;

switch means coupled to dividing means and selectably coupled to one of said third and fourth error signals dependent on said output of said first comparing means;

a clock signal coupled to said dividing means, said dividing means dividing said clock signal by a number dependent on said third and fourth error signals, said dividing means for providing a fifth error signal coupled to said input means.

17. The circuit of claim 16 wherein said input means comprises means for converting said input signal to a complex signal having a real and an imaginary portion and means for square summing said real and imaginary portions of said input signal.

18. The circuit of claim 16 wherein said selected number of said first and second power difference signals is greater when said sign of said fourth error signal is negative.

19. A method for controlling timing recovery of an input signal comprising the steps of:

generating a plurality of samples of said input signal;

generating a first and second power difference signals each representing a difference between selected of said plurality of samples;

summing a selected number of said first and second power difference signals to generate first and second output signals each having a sign and magnitude;

combining said input signal with one of said first and second output signals dependent on said sign of said second output signal.

20. The method of claim 19 further including the steps of:

multiplying said first output signal by a first predetermined scaling factor; and multiplying said second output signal by a second predetermined scaling factor.

21. The method of claim 20 wherein said plurality of samples comprises four.

22. The method of claim 21 wherein said step of generating said plurality of samples of said input signal comprises converting said input signal to a complex signal having a real and an imaginary portion and square summing said real and said imaginary portions.

* * * * *

UNITED STATES PATENT AND TRADEMARK OFFICE
CERTIFICATE OF CORRECTION

PATENT NO. : 4,866,739

DATED : September 12, 1989

INVENTOR(S) : Agazzi, et al

It is certified that error appears in the above-identified patent and that said Letters Patent is hereby corrected as shown below:

In column 1, line 34, delete "inadequate for", and insert in place thereof --adequate for--.

In column 3, lines 6 and 9, delete "16", and insert in place thereof --sixteen--;
line 16, "($a_i$, $b_i$,)" should read --($a_i$, $b_i$)--;
line 57, "differnce" should read --difference--.

In column 4, lines 6 and 15, delete "0", and insert in place thereof --zero--;
line 18, delete "of";
line 25, insert --per-- before "baud period";
line 36, "numnber" should read --number--;
line 48, "dependant" should read --dependent--;
line 52, delete "illustrating", and insert in place thereof --of--.

In column 5, lines 5 and 57, delete "9", and insert in place thereof --nine--;
lines 5 and 59, delete "32", and insert in place thereof --thirty-two--;
lines 13, 16 and 18, delete "10", and insert in place thereof --ten--;
line 29, "inputed" should read --inputted--;
line 40, after "Divide", insert --by--;
after "N", insert --43--;
line 59, "summd" should read --summed--.

UNITED STATES PATENT AND TRADEMARK OFFICE

CERTIFICATE OF CORRECTION

PATENT NO. : 4,866,739

DATED : September 12, 1989

INVENTOR(S) : Agazzi, et al

It is certified that error appears in the above-identified patent and that said Letters Patent is hereby corrected as shown below:

In column 6, line 17, delete "0", and insert in place thereof --zero--;
line 26, after "sampling", insert --,--;
line 32, "larger" should read --large--;
line 33, delete "32", and insert in place thereof --thirty-two--;
line 36, delete "10", and insert in place thereof --ten--;
line 42, before "and switch 41", insert --,--;
line 44, "+/-1/8" should read --+/-1/8--;
line 48, before "scaling factor", insert --a--;
line 52, "43" should be in bold faced type;
line 58, after "2400 Hz", delete "Hz";
line 66, delete "1", and insert in place thereof --one--.

In column 7, lines 1 and 2, delete "8", and insert in place thereof --eight--.

In claim 1, column 7, delete lines 36-58, from "first converting means" to and including "of said third output signal."

In claim 19, column 10, line 15, after "generating", delete "a".

Signed and Sealed this

Third Day of November, 1992

*Attest:*

DOUGLAS B. COMER

*Attesting Officer*

*Acting Commissioner of Patents and Trademarks*